United States Patent [19]

Kunze

[11] 4,117,078

[45] Sep. 26, 1978

[54] PROCESS FOR THE PRODUCTION OF HIGHLY CONCENTRATED MAGNESIUM CHLORIDE SOLUTIONS

[75] Inventor: Dietmar Kunze, Bad Salzdetfurth, Fed. Rep. of Germany

[73] Assignee: Kali und Salz Aktiengesellschaft, Kassel, Fed. Rep. of Germany

[21] Appl. No.: 782,410

[22] Filed: Mar. 29, 1977

[30] Foreign Application Priority Data

Mar. 29, 1976 [DE] Fed. Rep. of Germany ....... 2613288

[51] Int. Cl.$^2$ .......................... C01F 5/30; C01D 3/06; C01F 11/46
[52] U.S. Cl. .................................. 423/163; 423/499; 423/555
[58] Field of Search ................ 423/497, 555, 499, 163

[56] References Cited

U.S. PATENT DOCUMENTS

| 1,801,661 | 4/1931 | Collings | 423/497 |
| 1,875,070 | 8/1932 | Martin | 423/497 X |
| 2,479,001 | 8/1949 | Burke et al. | 423/497 X |
| 2,759,794 | 8/1956 | Fuchsman | 423/497 X |
| 3,729,550 | 4/1973 | Boyum et al. | 423/497 |

FOREIGN PATENT DOCUMENTS 2,450,259 4/1976 Fed. Rep. of Germany .......... 423/497

Primary Examiner—Edward Stern
Attorney, Agent, or Firm—Anthony DeLaurentis

[57] ABSTRACT

Concentrated magnesium chloride solutions are prepared from industrial liquors or brines by debrominating the liquor with chlorine, neutralizing the debrominated liquor up to a ph value of 3-6, adding a stoichiometric excess of calcium chloride to the neutralized liquor at temperatures in the range of 30°-50° C to form a calcium sulfate dehydrate crystallizate, separating the crystallizate from the mother liquor, adding a sufficient amount of carnallite to the mother liquor to increase the $MgCl_2$ content thereof to 270-330 g/l after cold decomposition of the added carnallite and concentrating the resulting solution in two or more steps in the direct current in an evaporator with crystallization characteristics up to a final concentration of 440 to 470 g/l $MgCl_2$ whereafter the concentrated magnesium chloride solution is separated from crude crystallized carnallite and sodium chloride formed during the concentration.

9 Claims, No Drawings

PROCESS FOR THE PRODUCTION OF HIGHLY CONCENTRATED MAGNESIUM CHLORIDE SOLUTIONS

For the production of metallic magnesium and other magnesium-containing products in large scale industrial processes, magnesium chloride solutions with as high as possible a content of $MgCl_2$ and as low as feasible content of any foreign and accompanying substances are used as a starting material. However, the magnesium chloride solutions obtained by the processing of crude potassium salts such as carnallite-containing crude potassium salts are just as unsuitable for this purpose as are magnesium chloride solutions which are obtained by the process of natural brines or artificial salt solutions obtained, for example, by leaching out potassium salt deposits, since magnesium chloride solutions obtained by the above processing techniques usually contain a magnesium chloride content of less than 320 g/l. In addition, such solutions also contain in substantial amounts alkali chloride and bromide, as well as magnesium sulfate, and in smaller quantities heavy metals and organic substances. Moreover, when such solutions are evaporated to increase the magnesium chloride content to as high a level as possible, the previously mentioned salts are separated as a mixture of potassium and sodium chloride, carnallite and sulfatic potassium magnesium salts, which mixture can be processed only with great difficulty.

In the German Pat. No. 676,406 it is stated in this regard as having been previously known that the magnesium chloride solutions obtained during the processing of carnallitic crude potassium slats are evaporated in a multistage evaporator up to the beginning of separation of carnallite and that they are separated from the mixture consisting of sodium chloride and native magnesium sulfate in the heat from the mixture crystallized thereby. During the subsequent cooling to room temperature, artificial carnallite crystallizes out of the solution which is separated from the final liquor. These final liquors always contain about 1% by weight of potassium and/or sodium chloride and considerable quantities of magnesium sulfate. The sulfate ions contained in the final liquor are then precipitated with milk of lime while the alkali chlorides during the evaporation of the magnesium chloride solution are separated by precooling and clearing up of the solution at a temperature of about 130° C. According to statements in the above mentioned patent, the liquor remaining after separation of the sodium chloride and native magnesium sulfate is then evaporated without intermediate cooling at temperatures rising gradually to above 115° C. At the same time artificial carnallite and almost the entire content magnesium sulfate is separated. This salt mixture is isolated from the solution. In the case of a subsequent cooling of the solution, a mixture consisting of carnallite and sodium chloride crystallizes out and is likewise separated from the solution. The remaining magnesium chloride solution is saturated with carnallite as well as with magnesium chloride, and may be used as a commercial product or it may be used for the production of solid magnesium chloride. However, this magnesium chloride is not usable for the main area of application, namely as a starting material for a smelting flux electrolysis because of its sulfate content. The sulfate content in the case of this known method of operation may be precipitated and separated during evaporation of the liquor through the addition of suitable precipitants, but there is also the possibility of removing the sulfate from the sulfate-containing magnesium chloride by recrystallizing the latter several times.

A further possibility is proposed in the German Pat. No. 1,667,826. According to this patent, the sulfate-containing magnesium chloride solutions are to be evaporated under a vacuum up to a temperature of 60°–90° C, and are to be heated at atmospheric pressure or slightly in excess of atmospheric pressure for up to 5 hours at temperatures between 108° and 130° C, whereupon the developing precipitate is separated at the same temperature.

Whenever liquors from the carnallite processing are used for this process, the filtrate is cooled subsequently to a temperature of about 25° C and is separated from the precipitate. The filtrate of the high temperature separation, or the filtrate obtained after cooling, is finally evaporated at temperatures of 60°–90° C up to a content of 50% by weight of magnesium chloride hexahydrate and is subsequently cooled. The bischofite obtained hereby is isolated as a product.

The remaining sulfate ions, as well as heavy metal and bromide ions, may be precipitated and separated from pre-purified industrial magnesium chloride solutions according to the disclosure of the German AS 2,118,623 by the addition of calcium and sulfide ions at temperatures of 50°–80° C and a pH value of 4–8. The remaining solution is subsequently treated with chloride. As a result of this procedure the bromide ions are oxidized to free bromine and the sulfide ions to sulfate ions. After the bromine has been driven out of the solution, the sulfate ions are precipitated by the addition of barium ions and then separated from the magnesium chloride solution which is practically free of sulfate.

The processes known from the status of the prior art essentially start out from the fact, that the debrominating of the liquor caused by the chlorine may be executed only whenever the magnesium chloride liquor has been largely freed of the chloridic and sulfatic salts as well as of the heavy metal ions. Experiments of debrominating the indutrial magnesium chloride solution evaporated up to a final concentration of 415 – 475 g/l of $MgCl_2$ directly in the heat under the influence of chlorine, always lead to strong salt deposits in the debrominating installation, which makes further operation impossible. In order to bring about the already very far reaching purification of the magnesium chloride liquors for the purpose of a continuous operation of the debrominating installation, it is necessary in the case of the previously known processes to cool the liquor or the turbid liquid, at least after the first evaporation, down to room temperature, to separate the solid substances, and to again heat it up subsequently for the debrominating. In the case of a differentiated cleaning of the liquor, a repeated cooling and reheating of the liquor may be necessary according to the known processes.

Therefore, there is a need for techniques of avoiding the occurrence of incrustations during the debrominating of already largely concentrated magnesium chloride solutions contaminated with sulfates, chlorides or bromides and other accompanying substances just as well as a repeated cooling and reheating of the lyes. Furthermore, there is a need for techniques of precipitating and separating the sulfate ions contained in these lyes in the form of an as pure as possible calcium sulfate dihydrate, which may be processed further directly without any further steps of purification.

With the foregoing in mind, a process has been found for the production of highly concentrated magnesium chloride solutions from industrial liquors or brines which, beside having a MgCl$_2$ content of less than 320 g/l, contains alkali chlorides, bromides, sulfates and other impurities. The process involves debromination by means of chlorine in the heat, neutralization, sulfate precipitation, concentration cooling and separation of crystallizates and impurities. According to the present process, the starting magnesium chloride liquor is first debrominated by the action of chlorine, is subsequently neutralized up to a pH value of 3 - 6 (measured undiluted), is then mixed at temperatures of 30° - 50° C. with a stoichiometric excess of calcium chloride, based on the sulfate content of the neutralized liquor, and is separated from the crystallized calcium sulfate dihydrate. The resulting magnesium chloride liquor is mixed with carnallite in quantities which are sufficient, after the cold decomposition of the carnallite, to increase the magnesium chloride content of the solution to 270 to 330 g/l, and the solution is then concentrated in two or more steps in the direct current in evaporators with crystallization characteristics up to a concentration of 440 to 475 g/l of MgCl$_2$. The resulting concentrate is cooled to room temperature, and is separated from the solid substances consisting essentially of carnallite and sodium chloride.

For carrying out the process of the invention, magnesium chloride liquors may be used which are obtained by the processing of potassium salts. But all other magnesium chloride solutions which contain the same or similar secondary substances, as obtained in the case of potassium salt processing, may be processed in accordance with the process of the invention. To these belong, among others magnesium chloride solutions which are obtained during the processing of natural brines, of sea water, or of salt solutions which are obtained by leaching salt deposits.

The magnesium chloride solution used as a starting material, the magnesium chloride content of which is to amount to less than 320 g/l MgCl$_2$, and preferably less than 260 g/l MgCl$_2$, is first debrominated, for example, in a manner known per se by the action of chlorine or of chlorine and air or oxygen, both at room temperature as well as in the heat. At the same time, beside the bromide ions, the oxidizable impurities are destroyed oxidatively or transferred to higher oxidation steps. Any small quantities of solid substances which might occur, do not disturb the debromination.

The reaction solution drawn off from the debromination step is then neutralized with, lime or dolomite milk, up to a pH of from 3 to 6. The measuring of this pH value is to take place in an undiluted reaction solution. As a result of this measure, the heavy metal ions are precipitated out as difficulty soluble precipitants. Next, the reaction solution, heated to a temperature of 30°–50° C, is mixed with calcium chloride, advantageously in an aqueous solution. The quantity of calcium chloride that is to be used in this case is preferably in excess of that quantity which is stoichiometric to the sulfate content of the solution. Thus, it has been found to be advantageous to use an excess of calcium chloride of 3-10 g/l. If a technically pure calcium chloride is used as a precipitant, the calcium sulfate dihydrate precipitated out of the solution is likewise pure and may be processed without any difficulty into a calcium sulfate capable of setting.

In this regard, it will be understood that an even purer calcium sulfate dihydrate may be precipitated out of the reaction solution whenever the latter has been freed of the solid substances obtained during neutralization prior to the addition of the calcium chloride.

Whenever a contaminated calcium chloride is used for the precipitation of the sulfate ions from the solution to be treated, as may be obtained, for example, in the case of the production of ammonia, soda or magnesium oxide, then it will be advantageous to mix the magnesium chloride solution, used as a starting material, first of all with the excess quantity of the calcium chloride, and then to feed the remaining solution, after separation of the calcium sulfate dihydrate, formed thereby, to the debromination. The solution freed of bromide, is neutralized subsequently up to a pH value of 3-6 (measured undiluted) and, after the separation of the precipitants obtained thereby, is fed to the carnallite decomposition.

In order to increase the magnesium chloride content of the reaction solution, the latter is mixed with carnallite in quantities which will be sufficient to adjust the magnesium chloride content to 270 to 330 g/l in this solution after the cold decomposition of the carnallite. This decomposition of carnallite with the magnesium chloride solution may be carried out according to one of the processes known for this purpose.

Subsequently the magnesium chloride solution now containing 270 to 330 g/l of MgCl$_2$ is concentrated in two or more steps in the direct current in evaporators with crystallization characteristics up to a concentration of 440 to 475 g/l MgCl$_2$, and is cooled at the same time to room temperature.

The highly concentrated magnesium chloride solution, striven for as a product, is separated after concentration from the precipitate consisting essentially of carnallite and sodium chloride. This magnesium chloride solution is practically free of sulfate and bromide impurities and contains only relatively small quantities of alkali chlorides.

Whenever a particularly pure carnallite is to be obtained, it may be of advantageous to interrupt the concentration when the concentration of MgCl$_2$ in the solution has reached 330 to 370 g/l, to separate the concentrate from the crystallizate developed thereby, which crystallizate consists essentially of sodium chloride, and then to further concentrate the solution up to the previously mentioned final concentration. The carnallite obtained during cooling of the solution concentrated to the final concentration still contains only small portions of sodium chloride.

The carnallite and sodium chloride solid substances separated in the final step of the concentration from the magnesium chloride solution may be returned, at least in part, into the process, while the residue may be processed in accordance with known procedures.

The process of the invention offers the possibility in any case of precipitating a calcium sulfate dihydrate at temperatures below 50°, which calcium sulfate dihydrate is usable without any further purification for the most industrial applications. Moreover, the calcium sulfate obtained in accordance with the process of the invention exhibits good filtration characteristics and for this reason may be separated easily from the magnesium chloride solution. Still further, it has been shown that when a small excess of calcium chloride is used according to the invention, an exceptional lowering of the sulfate content in the rest of the solution will be achieved which, after separation of the calcium sulfate dihydrate, contains less than 0.5 g/l of sulfate. In addition, the process of the invention offers the possibility of producing a technically pure carnallite even if a contaminated calcium chloride had been used for the precipitation of the sulfate. Furthermore, the final concentration of the magnesium chloride solution with an energy saving direct current concentration will be achieved with simultaneous cooling.

EXAMPLE 1

10 m³ of magnesium chloride brine with 240 g/l $MgCl_2$, 100 g/l KCl, 60 g/l of NaCl, 60 g/l of $MgSO_4$, 2 g/l bromide and 833 g/l of $H_2O$ are debrominated by the addition of 13 kg of chlorine and 150 m³ of air to a residual value of 5 mg/l of bromide at room temperature, are neutralized subsequently with 7.5 kg of calcium oxide to a pH value of 4.5 (measured undiluted) and are mixed after adjustment of the temperature to 35° C with 603 kg of calcium chloride. After separation of 858 kg of $CaSO_4.H_2O$ with 30% by weight of adhering liquor, 9.71 m³ of magnesium chloride solution with 287 g/l of $MgCl_2$, 0.2 g/l of $MgSO_4$ and 5 g/l of $CaCl_2$ will be obtained.

671 kg of carnallite are added to this magnesium chloride solution and after decomposition of the carnallite is completed, 645 kg of decomposition potassium chloride are separated from the resulting liquor. There remain 9.96 m³ of magnesium chloride solution with 310 g/l $MgCl_2$, 0.2 g/l $MgSO_4$, 50 g/l KCl, 40 g/l NaCl and 879 g/l $H_2O$.

This solution is concentrated in two steps in direct current, whereby 3428 kg of water are evaporated. After cooling to a temperature of 25° C and subsequent separation of 2.197 kg of carnallite and sodium chloride, there remain as a product 5.35 m³ of highly concentrated magnesium chloride solution with 460 g/l $MgCl_2$, 0.5 g/l $MgSO_4$, 1.5 g/l KCl, 5 g/l NaCl, 20 mg/l bromide and 862 g/l $H_2O$.

EXAMPLE 2

The procedure of Example 1 is followed, except that the evaporation is interrupted after the first step at 350 g/l $MgCl_2$ and 110 kg of 90-95% NaCl is separated from the solution along with carnallite. The processing is then continued according to Example 1. The carnallite (1.82 kg) obtained after cooling of the concentrated solution to a temperature of 25° C then only contains 12.5% by weight of NaCl.

What is claimed is:

1. In a process for the production of highly concentrated magnesium chloride solutions from industrial liquors or brines which contain less than 320 g/l MgCl2, and which also normally contain alkali metal chlorides, bromides and sulfates and other impurities, wherein the production steps include debromination by means of chlorine, neutralization, sulfate precipitation, concentration, cooling and separation of crystallizates and impurities, the improvement which comprises:
   (a) first debrominating an industrial liquor or brine by the addition of chlorine thereto;
   (b) neutralizing the debrominated liquor up to a pH value of 3-6;
   (c) admixing with the neutralized liquor at temperatures in the range of 30°-50° C. a stoichiometric excess of calcium chloride, based on the sulfate ion content of said neutralized liquor, to form a calcium sulfate dihydrate crystallizate;
   (d) separating the crystallized calcium sulfate dihydrate from the remaining magnesium chloride solution, said magnesium chloride solution containing less than 260 g/l $MgCl_2$;
   (e) adding a sufficient amount of carnallite to said magnesium chloride solution to increase the $MgCl_2$ content of said solution to 270-330 g/l after cold decomposition of the added carnallite;
   (f) concentrating the resulting liquor up to a concentration of 440 to 475 g/l $MgCl_2$ in two or more steps in a direct current multi-stage evaporator;
   (g) cooling the concentrate to room temperature; and
   (h) separating said concentrate from the solid substances formed during the concentration, said solid substances consisting essentially of carnallite and sodium chloride.

2. The process of claim 1, wherein any solid substances formed in step (b) during the neutralization of said debrominated liquor are separated from said neutralized liquor before the latter is mixed with said calcium chloride in step (c).

3. The process of claim 2, wherein the concentration of the mixed magnesium chloride solution and carnallite in step (f) is carried out in a first step up to a concentration of 330-370 g/l $MgCl_2$, whereafter a crystallizate consisting of essentially sodium chloride is separated from the first step concentrate, and whereafter the first step concentrate is then concentrated further to a concentration of 440 to 475 g/l $MgCl_2$.

4. The process of claim 2, wherein the carnallite added in step (e) to said magnesium chloride solution which is separated from said calcium sulfate dihydrate in step (d) comprises said solid substances consisting essentially of carnallite and sodium chloride which are separated from said concentrate in step (b).

5. The process of claim 1, wherein the concentration of the mixed solution and carnallite in step (f) is carried out in a first step up to a concentration of 330-370 g/l $MgCl_2$, whereafter a crystallizate consisting of essentially sodium chloride is separated from the first step concentrate, and whereafter the first step concentrate is then concentrated further to a concentration of 440 to 475 g/l $MgCl_2$.

6. The process of claim 1, wherein the carnallite added in step (e) said magnesium chloride solution which is separated from said calcium sulfate dihydrate in step (d) comprises said solid substances consisting essentially of carnallite and sodium chloride which are separated from said concentrate in step (h).

7. In a process for the production of highly concentrated magnesium chloride solutions from industrial liquors or brines which contain less than 320 g/l $MgCl_2$, and which also normally contain alkali metal chlorides, bromides and sulfates and other impurities, wherein the production steps include debromination by means of chlorine, neutralization, sulfate precipitation, concentration, cooling and separation of crystallizates and impurities, the improvement which comprises:
   (a) adding to an industrial liquor or brine at temperatures in the range of 30°-50° C a stoichiometric excess of calcium chloride, based on the sulfate ion content of the liquor, to form a calcium sulfate dihydrate crystallizate;
   (b) separating said crystallizate from the remaining liquor;
   (c) debrominating said remaining liquor by the addition of chlorine thereto;

(d) neutralizing the debrominated liquor up to a pH value of 3-6 to form a precipitate;

(e) separating the precipitate from said neutralized liquor;

(f) admixing with said neutralized liquor a sufficient amount of carnallite to increase the $MgCl_2$ content thereof to 270-330 g/l after cold decomposition of the added carnallite;

(g) concentrating the resulting liquor up to a concentration of 440 to 475 g/l $MgCl_2$ in two or more steps in a direct current multi-stage evaporator;

(h) cooling the concentrate to room temperature; and (i) separating said concentrate from the solid substances formed during the concentration, said solid substances consisting essentially of carnallite and sodium chloride.

8. The process of claim 7, wherein the concentrate of the mixed solution and carnallite in step (g) is carried out in a first step up to a concentration of 330-370 g/l $MgCl_2$, whereafter a crystallizate consisting of essentially sodium chloride is separated from the first step concentrate, and whereafter the first step concentrate is then concentrated further to a concentration of 440 to 475 g/l $MgCl_2$.

9. The process of claim 7 wherein the carnallite added to the neutralized liquor in step (f) comprises said solid substances consisting essentially of carnallite and sodium chloride which are separated from said concentrate in step (i).

* * * * *